Figure 1:
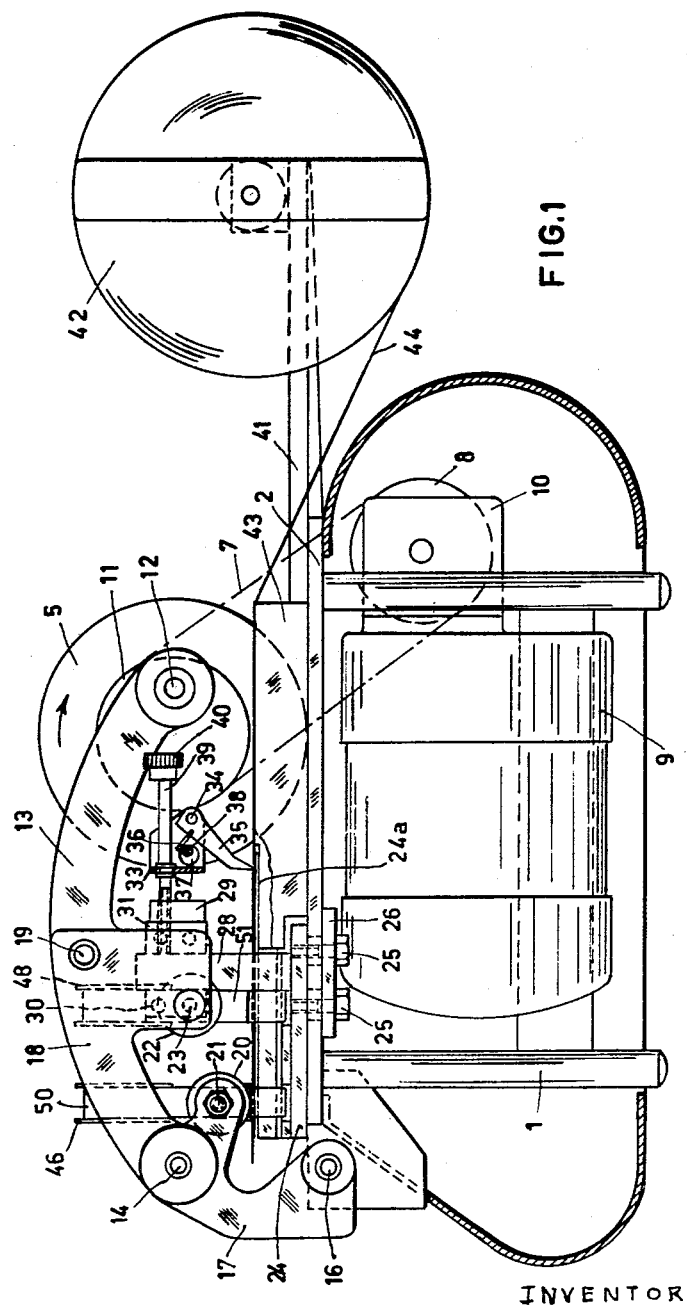

Feb. 4, 1964 J. S. LAMERS 3,120,178
MACHINE FOR PROCESSING A STRIP OF MATERIAL, FOR
INSTANCE FOR PRINTING LABELS, TAGS OR TICKETS
Filed Aug. 22, 1960 5 Sheets-Sheet 1

INVENTOR
JACOBUS S. LAMERS
By Wenderoth, Lind & Ponack
ATTYS

INVENTOR.
JACOBUS S. LAMERS

INVENTOR.
JACOBUS S. LAMERS
BY Wenderoth, Lind & Ponack
ATTYS

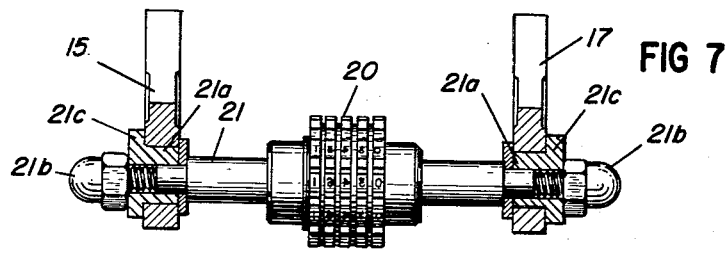
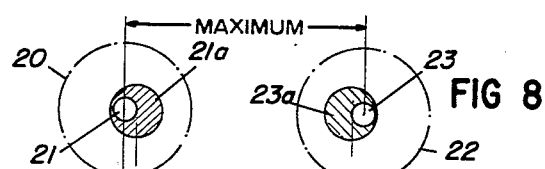 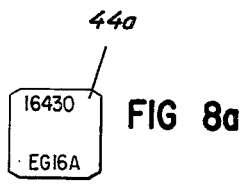
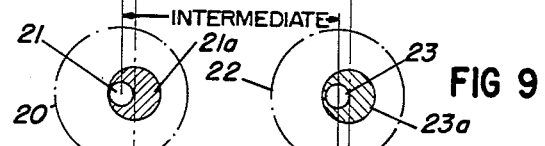 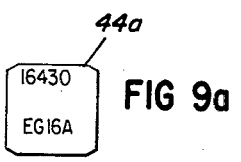
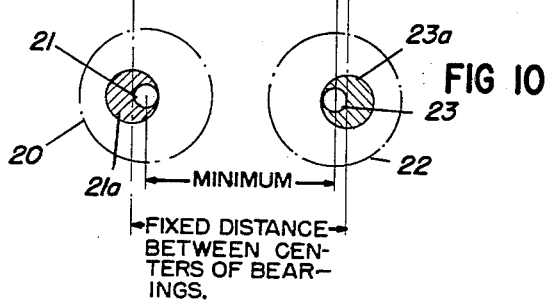 
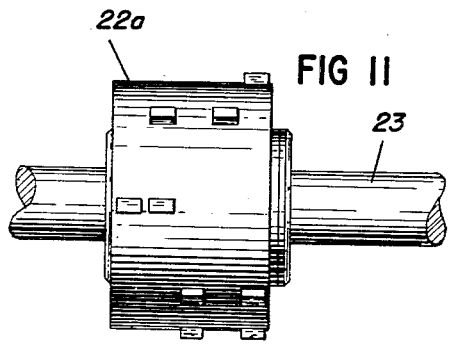

3,120,178
MACHINE FOR PROCESSING A STRIP OF MATERIAL, FOR INSTANCE FOR PRINTING LABELS, TAGS OR TICKETS
Jacobus S. Lamers, Arnhem, Netherlands, assignor to N.V. Etikettenfabriek Gebr. Mogendorff, Arnhem, Netherlands, a limited liability company of the Netherlands
Filed Aug. 22, 1960, Ser. No. 51,050
Claims priority, application Netherlands Aug. 25, 1959
11 Claims. (Cl. 101—90)

The invention relates to a machine for processing (e.g. printing, punching, perforating and/or shearing) a strip of material of the kind comprising at least two dies (e.g. printing sets, punching dies, perforating dies and/or shearing dies), along which the said strip is movable, one of said dies being carried by a lever which is adapted to swing about a fixed point and which is connected with one end of a connecting rod which with its other end is connected with a crank pin which is supported by a driving shaft so that the said first die is rendered inoperative when said connecting rod is in a dead position, whereas the other die is also adapted to be moved by said connecting rod.

An object of the invention is to provide a machine of this kind which is suitable for printing a strip of material in the form of a roll of labels, tags or tickets with a dividing perforation or other incisions and/or for perforating the strip and/or for cutting off parts of said strip in the form of labels, tags or tickets.

A further object of the invention is to provide a machine for printing labels, tags or tickets with at least two different imprints, said machine permitting the adjustment of the mutual distance between the imprints on each label, tag or ticket and/or the distance between the imprints and a perforation or other dividing line on said strip.

The above objects are achieved by a machine of the kind described which according to the invention is characterized in that said connecting rod carries said second die and is operatively connected with a mechanism for intermittently advancing said strip with a reciprocating support for the strip in respect of which said second die is guided in such a way that after the connecting rod has passed its dead position the connecting rod moves the second die in the direction of the movable support to a position in which the second die is operative.

The machine according to the invention is suitable to be developed further in different ways. As an example the mechanism for intermittently advancing the strip comprises a swinging pawl and a carrier for the shaft of said pawl is connected with said second die in such a way that said shaft follows the reciprocating movement of the movable support so that the pawl in one direction of movement engages the strip and shifts it in the same direction and at the same speed as the direction and speed of movement of said support, whereas in opposite direction of movement of the said shaft said pawl moves back inoperatively with respect to the strip.

Other objects of the machine according to the invention will appear from the following description of an embodiment and are claimed in the claims, while the advantages which may be attained by this machine are set forth in the description.

Figure 2:
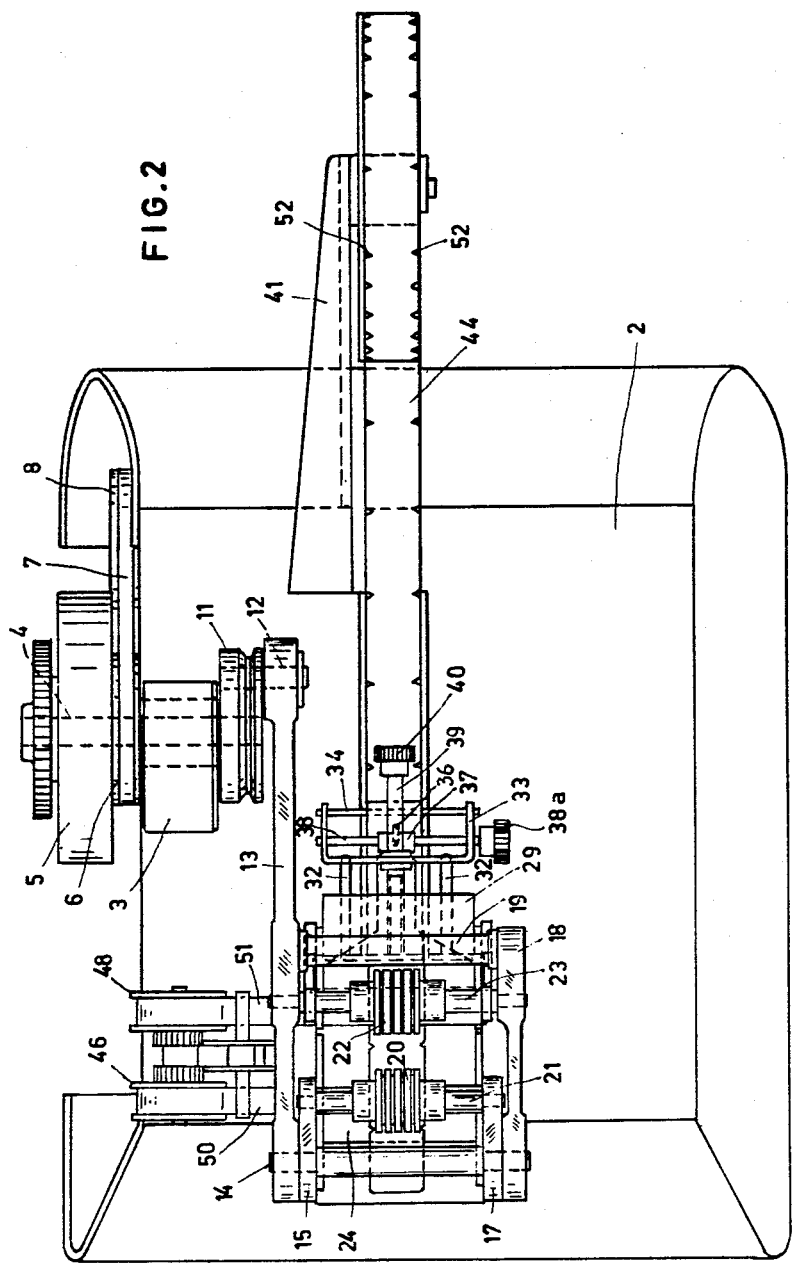
Figure 3:
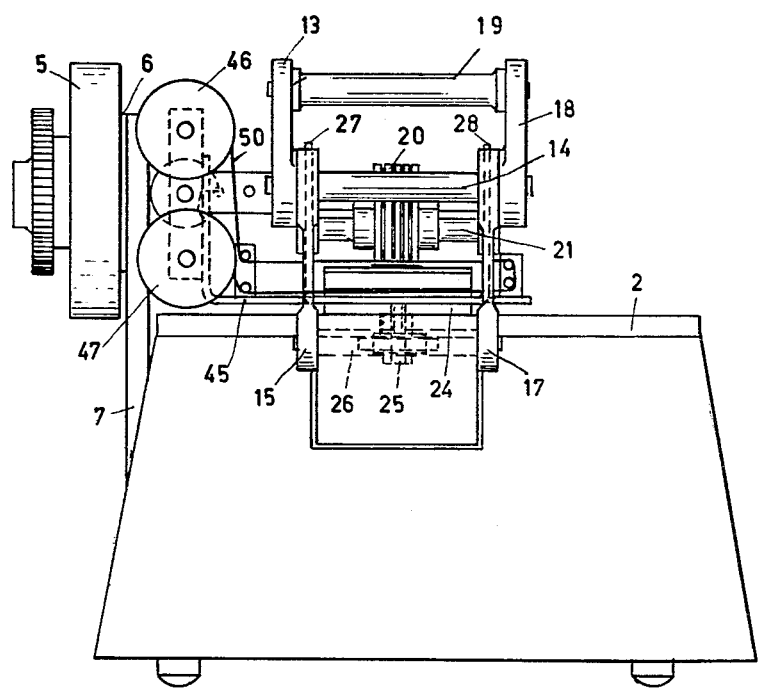
Figure 4:
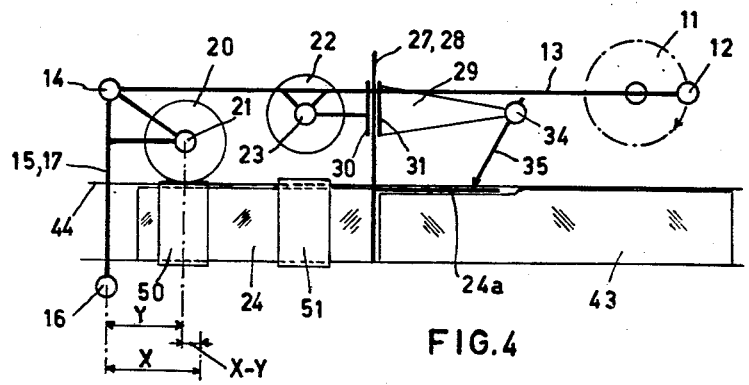
Figure 5:
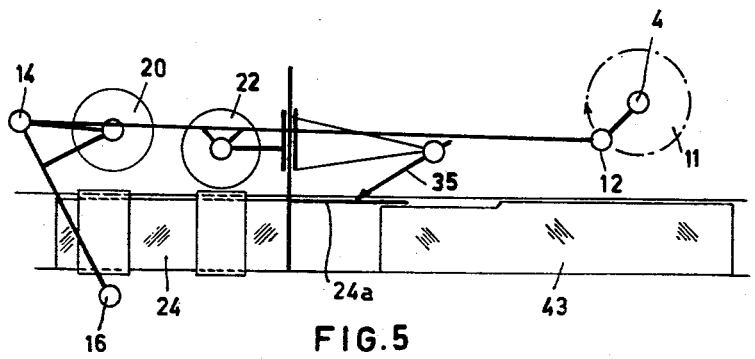
Figure 6:
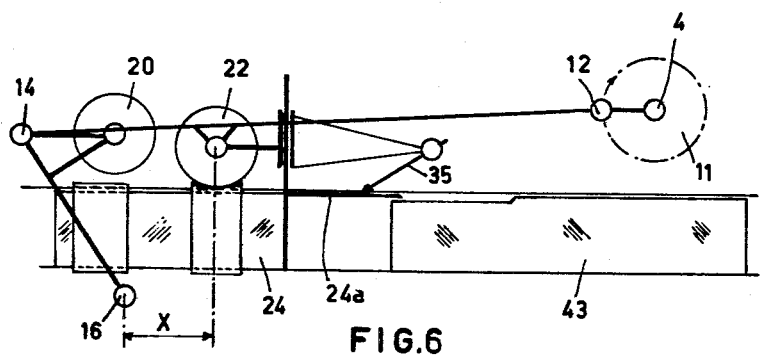

Although the machine according to the invention is adaptable to various objects it will be described with reference to an example of a machine for printing a strip of labels as shown in the drawings. In these drawings:

FIGURE 1 is a side view of the machine,
FIGURE 2 is a plan view,
FIGURE 3 is an end view,
FIGURES 4–6 are diagrammatical views which show the principal parts of the machine in different positions,
FIGURE 7 is a partial elevation partly in section showing one of the printing sets,
FIGURE 8 is a diagrammatical view showing one position of the shafts of the printing sets,
FIGURE 8a is a plan view of a printed label when the printing sets are positioned as shown in FIGURE 8,
FIGURE 9 is a view similar to FIGURE 8 showing a different position of the shafts of the printing sets,
FIGURE 9a is a plan view of a printed label secured when the printing sets are positioned as shown in FIGURE 9 illustrating an intermediate position,
FIGURE 10 is a diagrammatical view illustrating a different position of the shafts of the printing sets,
FIGURE 10a is a plan view of a printed label secured when the printing sets are located as shown in FIGURE 10 at a minimum distance from one another, and
FIGURE 11 shows a perforator roller which may be substituted for the printing roller 20 in FIGURE 7 when it is desired to perforate a label instead of printing thereon.

The machine shown in FIGURES 1, 2 and 3 consists of a frame 1 with a base plate 2. This plate carries by means of a support 3 the shaft 4 of a fly wheel 5 which is provided with a pulley 6. The pulley is driven by means of a belt 7 and a second pulley 8, by an electric motor 9 through the intermediary of a reduction gear 10. The motor is arranged within the frame 1.

A crank disc 11 is fixed on the shaft 4 of the fly wheel 5 and is provided with a crank pin 12. A connecting rod 13 is connected at one end with the crank pin 12 and at its other end by means of a pivot 14 with a lever 15 which is fixed to shaft 16. This shaft 16 carries a second lever 17 and the pivot 14 connects this second lever 17 with an auxiliary connecting rod 18. A member 19 is arranged between the connecting rod 13 and the auxiliary connecting rod 18, so that the auxiliary connecting rod 18 follows the swinging movement of the connecting rod 13. The second lever 17 follows the swinging movements of the lever 15, said swinging movements being effected by the rotation of the crank disc 11.

In the example a register printing set 20 is arranged between the levers 15 and 17, said printing set consisting of a plurality of rotatable discs arranged on a shaft 21. Adjusting wheels for adjusting each of the discs in their desired positions may be arranged in the usual way above the printing set 20, but are omitted in the drawings for clearness' sake. A second register printing set 22 which also consists of a plurality of rotatable discs, is arranged on a shaft 23 between the connecting rod 13 and the auxiliary connecting rod 18. The shaft 21 of said first printing set 20 between the levers 15 and 17 and the shaft 23 of said second printing set 22 between the connecting rod 13 and the auxiliary connecting rod 18 are adjustable by means of eccentric bearings shown in FIGS. 7–10. By adjusting these bearings it is possible to adjust the mutual distance of the printing sets and thereby the distance between the imprints made by said printing sets. The way in which this is effected will be explained below.

A slot is formed in the plate 2 in longitudinal direction of the machine (i.e. parallel with the connecting rod 13) serves as a guide for a slide 24 which by means of screw 25 and spacing tubes is connected with a sliding plate 26 which slides in contact wtih the lower face of the plate 2.

The slide 24 is provided with a thin extension piece 24a and carries two vertical guiding rods 27 and 28. A carrier 29 is connected, by means of the shaft 23, with the connecting rod 13 and with the auxiliary connecting rod 18 and is provided with sliding blocks 30 and 31 which are adapted to slide along the guiding rods 27 and 28. In this way the carrier 29 with the printing set 22 is prevented from swinging during its up and down movements. If the crank disc 6 rotates and thus the connecting rod 13 and the auxiliary connecting rod 18 perform a swinging movement, the carrier 29 is taken along up and down by the horizontal component of the movement of the shaft 23. The guiding rods 27 and 28 and thereby also the slide 24, 24a, are reciprocated in the longitudinal direction of the machine.

A stirrup 33 is connected with the carrier 29 by means of rods 32 which are slidable in bores in the carrier 29. The stirrup 33 carries a shaft 34 upon which a forked pawl 35 is pivoted. An abutment pin 36 carried by the pawl 35 bears against an eccentric 37 which is fixed to a shaft 38. This shaft can be turned in the stirrup 33 by means of an adjusting knob 38a and can be fixed in the desired angular position. The position of the eccentric 37 determines the lowermost position of the pawl 35, if the carrier 29 is raised.

The distance between the stirrup 33 and the carrier 29 may be adjusted by means of a screw 39 which engages a screw threaded hole in the carrier 29. The adjusting screw 39 extends through an opening in the stirrup 33 and is provided with a small collar at both sides of the cross member of the stirrup. If thus the adjusting screw is turned by means of a knob 40, the distance between the stirrup 33 and the carrier 29 (and consequently between the shaft 34 of the pawl 35 and the shaft 23 of the printing set 22) is increased or decreased during which movement the stirrup is guided by the rods 32.

An arm 41 is fixed to the base 2 and carries a stock of paper strip 44 in the form of a roll 42. This strip is guided over the profiled upper face of a block 43 which is fixed to the base 2. A brake which prevents the paper strip 44 from sliding back is not shown in the drawings for sake of clearness.

The slide 24 carries by means of a support 45 two spools 46 and 47 and two spools 48 and 49 of which the spool 49 is not shown in the drawings. An ink ribbon 50 is guided from the spool 46 over the upper face of the slide 24 and thereafter through a slot in the slide to the spool 47. An ink ribbon 51 of the spool 48 is guided along a corresponding way to the (not shown) spool 49. The ink ribbons 50 and 51 may be of the same color or of different colors.

In the embodiment shown in the drawings the ink ribbons 50 and 51 are guided transversely to the direction of movement of the paper strip 44. However, they may also be guided in the direction of this movement, although guiding transversely permits a more compact construction of the machine. The ink ribbons may be advanced over a small distance at each stroke of the machine as in typewriters. Instead of ink ribbons it is also possible to use inking pads, inking rollers or the like.

In order to explain the operation of the machine reference is made to the diagrammatical FIGURES 4–6.

FIG. 4 shows the position of the parts of the machine after the crank pin 12 has rotated a quarter of a turn from its upper-most point by turning the crank disc 11 in the direction of the arrow. The pawl 35 of which the lower-most angular position is determined by the eccentric 37 on the shaft 38, has descended in FIG. 4 and is in contact with the strip 44.

During the continuous rotation of the crank disc 11 the pawl 35 slides over the strip which is provided with the notches 52 (or with perforations) until the teeth of the forked pawl engage two notches and shift the strip to the left.

In the position of FIG. 4 the printing set 20 has swung about the shaft 16 to the right and makes an imprint on the strip at a fixed horizontal distance Y with respect to the shaft 16.

At a further rotation of the crank disc 11 (FIG. 5) the connecting rod 13 lowers the shaft 34 of the pawl 35 during which movement the sliding blocks 30 and 31 slide along the rods 27 and 28 downward. As the crank pin 12 is moved to the left, the levers 15 and 17 are swung about the stationary shaft 16. As a result the printing set 20 is raised while the shaft 23, and consequently the carrier 29 with the shaft 34 of the pawl 35 descend further. The strip 44 follows the movement of the slide 24 and of its extension piece 24a to the left, and the printing set 22 makes an imprint on the strip 44 at the horizontal distance X with respect to the stationary shaft 16.

In the position of the crank pin 12, as shown in FIG. 6, the pawl 35 does not advance the strip anymore and during a continued rotation of the crank disc 11 with crank pin 12 the connecting rod 13 rises further, the printing set 22 moves upward and to the right, so that also the shaft 34 rises and lifts the pawl 35 from the notches 52. During this part of the stroke the strip 44 stands still and the printing set 20 swings again to the right to make an imprint on the label that has already been provided with an imprint by the printing set 22. The distance between both imprints on one label is determined by X—Y.

The distances X and Y may be chosen such that X is larger or smaller than Y, so that the imprints on the labels may be obtained at a minimum distance X—Y. The distance X—Y may even be chosen nil or negative.

It follows from the above that the imprint of the printing set 20 is made during a standstill of the strip, whereas the imprint of the printing set 22 is made while this printing set and the strip 44 move together with the same speed. In this way smudged imprints are prevented.

By means of the adjusting screw 39, 40 it is possible to adjust the distance between the entire advancing mechanism and the printing set 22, and in this way the distance between an imprint of this printing set to the connecting line of two notches 52 or a line of perforation.

By adjusting the lower-most position of the pawl 35 by means of the adjusting knob 38a it is possible to determine the point at which the pawl comes into contact with the paper strip. This is of importance in connection with the length of advancement at each stroke which length must be greater for long labels than for short ones.

The machine can also operate without the pawl 35. In this case the printing set 22 takes the strip 44 along as it is pinched between the printing set 22 and the slide 24.

The shaft 21 is carried in eccentric bearings 21a in the levers 15 and 17. The shaft 23 is carried in exactly the same way by means of eccentric bearings 23a in the connecting rod 13 and the auxiliary connecting rod 18. Therefore only by shaft 21 is shown and described.

In order to adjust the position of the bearings 21a, and thereby the position of shaft 21, nuts 21b on the ends of said shaft 21 are loosened. The bearings 21a are then free to be turned. This may be done by means of flanges 21c of said bearings. To this aim said flanges may be hexagonal or may be formed with notches to receive a spanner in any known way. After adjusting the new position of the shaft 21, the nuts 21b are tightened again (FIG. 7).

The result of the relative adjustment of the shafts 21 and 23 is represented in FIGS. 8–10 which show three different positions of said shafts and the resulting imprints on a label made by the respective printing sets 20 and 22.

According to FIG. 8 the distance between the centers of the shafts 21 and 23 is a maximum due to the fact that the bearings 21a and 23a have been turned to a position in which their bores carrying the ends of the respective shafts 21 and 23, have been moved to the left and to the right, respectively. The result is that the imprint made by the printing set 20 on a label 44a (see FIG. 4) is at a maximum distance from the imprint which has already been made on the same label 44a by the printing set 22 (see FIG. 6) and has been advanced by the movement of the strip 44 to a position under the printing set 20.

According to FIG. 9 the first mentioned imprint on the label 44a is on the same place as that shown in FIG. 8, but the second imprint has been made higher, due to the changed position of the eccentric bearings 23a. It will be seen that the space between the imprints has been reduced.

According to FIG. 10 the second imprint is at the same place as that shown in FIG. 9, but the first mentioned imprint has moved to a lower place, thus reducing the space between the imprints to a minimum.

In FIG. 11 a perforating roller is indicated at 22a as mounted upon the shaft 23 in place of the printing set 20 of FIG. 7. It is obvious that such a perforator roller may also be substituted for the printing set 20 if desired.

The following advantages are obtained by the machine according to the invention.

(1) The construction of the machine is very compact and servicing is very simple.

(2) The mutual distance of the imprints is independent of the thickness of the paper strip.

(3) It is possible to adjust both imprints at any mutual distance, even to a distance nil or negative.

(4) Since the slide 24, the printing set 22 and the ink ribbon 51 move together with the strip 44, and since during the imprint of the printing set 20 the slide 24 and the ink ribbon 50 stand still there is no danger of smudging while making the imprints.

(5) There is no variation of the imprint with respect to the notches or perforations.

(6) It is possible to print labels in different colors by choosing differently colored ink ribbons 50 and 51.

(7) Different lengths of advancement may readily be adjusted by means of the eccentric 37 which serves as an abutment for the pin 36 of the pawl 35 so that the pawl engages the strip earlier or later.

(8) Since the pawl 35 is lifted from the strip at a return stroke there is no danger that the pawl takes the part of the stroke backward which is prevented between the pawl and the (not shown) paper brake.

(9) The machine may be executed in such a way that the longer axes of the elliptic movement of the printing set 22 make a certain angle with respect to the strip or are parallel therewith. In this way the printing set 22 remains a shorter or a longer time in contact with the strip, so that no notches or perforations are necessary for advancing the strip. In this case the pawl 35 is inoperative.

In the drawings an embodiment is shown in which by way of example the machine has two printing sets. As has been remarked already the usual adjusting wheels for the discs of the printing sets are omitted. It is also possible to execute the machine in such a way that e.g. one of the printing sets is provided with a known automatic device by which at each stroke of the machine a subsequent number is printed.

The machine may also be adapted to other operations than printing. It is possible to substitute e.g. one of the printing sets by a punching die or by a perforator if the machine must be used for punching cards as used in the known Hollerith system. Each card may be provided with an imprint (e.g. ascending numbers) by one printing set and the punching device may be made adjustable, so that after a predetermined number of cards the punching hole or holes are made in different places.

What is claimed is:

1. Device for stamping strip material which is intermittently fed by a feeding device by means of two successive dies which are controlled by a single crank and connecting rod mechanism having two dead centres, the printing position of one of said dies being interrelated to one of said dead centres and the printing position of the other of said dies being interrelated to the other of said dead centres, and in which one of said dies is carried by a lever which at one end is pivotable about a fixed point and at the other end is pivotally connected with the end of said connecting rod that is remote from said crank, characterized in that said other die is secured to said connecting rod and is connected as well with said strip conveyor which thereby performs the same movement as said other die, as with a movable support for the strip, which support is consequently constrained to perform the same movement, the arrangement being such that said other die has finished its printing action on a certain printing area of the strip at the moment at which said strip conveyor has moved the strip as far as the place where said first-mentioned die is indicated to perform its printing action on said same printing area.

2. Stamping device according to claim 1 wherein said strip conveyor comprises a carrier which is slidable along a guide that is vertically secured to said strip support, said carrier at one side of said guide carries the shaft of said other die and at the other side of its guide carries a rotatable shaft to which conveyor pawls are secured, the points of said pawls being adapted to be moved above said movable strip support.

3. Stamping device according to claim 2 wherein said pawl shaft is adjustable parallel to said movable strip support by means of an adjusting device which is connected with said carrier in such a way that the place of the conveying stroke is adjustable relative to said strip support, and that an adjustable abutment is arranged to limit the swinging movement of said pawls in a way to adjust the length of said conveying stroke.

4. Stamping device according to claim 3 wherein said movable strip support carries ink ribbon means.

5. A machine for processing a strip of material through a plurality of stations comprising means for operating upon said strip at said stations, a driving shaft, a crank disc mounted on said shaft, a crank pin on said disc, a connecting rod having two dead center positions with respect to said disc connected at one end to said crank pin, a pivotally mounted lever connected to the other end of said connecting rod upon which the operating means of a first station is mounted so that said operating means is rendered inoperative when said connecting rod is in one of said dead positions, means connecting the operating means of a second station to said connecting rod so that said operating means of said second station is operative when said operating means of said first station is inoperative, means for intermittently advancing said strip past said stations connected to said connecting rod, a reciprocating support for said strip having means for guiding said operating means of said second station so that after said connecting rod has passed said one of said dead positions said connecting rod at the other of said dead positions has moved said second operating means with said movable support to a position in which said second operating means is inoperative and said first operative means operative.

6. A machine for processing a strip of material such as set forth in claim 5 wherein means are provided for adjusting the distance between said operating means of said first station and said operating means of said second station.

7. A machine as set forth in claim 5 wherein said means for intermittently advancing said strip comprises a pivoted pawl and a carrier for said pawl connected to said operating means of said second station so that said carrier follows the reciprocating movement of said reciprocating support in one direction engaging the strip and moves said strip in the same direction and at the same speed as the direction and speed of movement of said support whereas upon an opposite movement of said carrier said pawl is inoperative with respect to said strip.

8. A machine as set forth in claim 7 wherein said carrier follows the rising movement of said operating means said second station and an abutment is provided for limiting the rotation of said pawl.

9. A machine as set forth in claim 8 wherein said abutment comprises an adjustable eccentric.

10. A machine as set forth in claim 5 wherein said operating means are printing means and wherein inking ribbons are connected with said movable support.

11. A machine as set forth in claim 5 wherein one of said operating means is a printing means and the other operating means is a perforator for said strip.

References Cited in the file of this patent
UNITED STATES PATENTS

| | | |
|---|---|---|
| 1,210,071 | Hoffman | Dec. 26, 1916 |
| 1,494,184 | Pannier | May 13, 1924 |
| 2,359,207 | Deane | Sept. 26, 1944 |
| 2,482,542 | Hanrahan | Sept. 20, 1949 |
| 2,617,357 | Schmieder | Nov. 11, 1952 |